United States Patent [19]

Werner et al.

[11] Patent Number: 4,663,175

[45] Date of Patent: May 5, 1987

[54] METHOD FOR MAKING A FLAVORED NUT PRODUCT

[75] Inventors: John Werner, Fairfield, Conn.; Gilbert Finkel, Parsippany, N.J.

[73] Assignee: Seaboard Deluxe, Inc., Southport, Conn.

[21] Appl. No.: 737,098

[22] Filed: May 23, 1985

[51] Int. Cl.[4] .............................................. A23L 1/36
[52] U.S. Cl. ..................................... 426/289; 426/93; 426/293; 426/303; 426/438
[58] Field of Search ............... 426/291, 292, 302, 303, 426/559, 629, 632, 661, 445, 460, 466, 93, 94, 102, 438, 293

[56] References Cited

U.S. PATENT DOCUMENTS

| | | | |
|---|---|---|---|
| 3,063,843 | 11/1962 | Hashimoto | 426/303 |
| 3,647,474 | 3/1972 | Dame et al. | 426/331 |
| 4,053,650 | 10/1977 | Chino et al. | 426/305 |
| 4,161,545 | 7/1979 | Green et al. | 426/309 |
| 4,499,113 | 2/1985 | Mochizuki et al. | 426/93 |
| 4,501,758 | 2/1985 | Morris | 426/93 |
| 4,522,833 | 6/1985 | Sharma | 426/303 |

OTHER PUBLICATIONS

Matz, 1976, Snack Food Technology, AVI Publishing Co., Inc, Westport, Conn., pp. 129–133.

Primary Examiner—Raymond N. Jones
Assistant Examiner—Carolyn Paden
Attorney, Agent, or Firm—Lieberman, Rudolph and Nowak

[57] ABSTRACT

A flavored-nut product, made by coating nuts (or other centers) alternately with a liquid mixture (of water, sugar, and modified tapioca) and a solids mixture (of flour, modified corn starch, sugar and salt, with small amounts of flavoring, usually mixed with a small amount of vegetable oil), and each time permitting the solid portion to dry before the next additions of liquids. When the desired thickness of coating is obtained, usually after four to six repetitions, the liquid and solid multi-coated nuts are deep-fat fried.

5 Claims, No Drawings

METHOD FOR MAKING A FLAVORED NUT PRODUCT

BACKGROUND OF THE INVENTION

The present invention relates to a flavored nut product and to an advantageous process for making such a product.

The problem of creating new "snack" foods is well recognized, see U.S. Pat. No. 3,348,950 to Weiss. It is difficult to create a new and distinctive taste that is still acceptable to a consuming public (which has generally shown a preference for the familiar); and that lends itself to reliable quality control, practical and economical production techniques, and has sufficiently long "shelf-life" for the realities of modern food distribution.

It is known in the art to provide nuts with various flavored coatings. For example, U.S. Pat. No. 3,063,843 to Hashimoto disclosed a flavored nut made by adding succeeding layers of sugar syrup, and then flour, to nut centers; followed by roasting; and finally coating with a flavored sauce. However, Hashimoto has been criticized (see U.S. Pat. No. 4,161,545 to Green et al.) as failing to give a wholly satisfactory product, both as to color and flavor. The method of Hashimoto can be inefficient, hence expensive, in requiring a separate roasting stage, a separate flavor coating stage, and a separate and additional drying stage (note FIG. 1 therein). Further, the moving air method of Hashimoto is a not the most efficient heat exchange mechanism, and does not contribute to the flavor of the final food product.

U.S. Pat. No. 3,787,588 to Turitz disclosed wrapping a dough, made from a kneaded mixture of corn and wheat flour, around a peanut center; and then baking or deep-fat frying; optionally glazing prior to baking. However, Turitz has been criticized (see U.S. Pat. No. 4,053,650 to Chino et al.) as involving a difficult and troublesome step of wrapping small edible items, it being particularly difficult to so wrap without strain and unevenness in thickness, leading to uneven expansion when cooked. The method of Turitz involves the expensive and inefficient steps of kneading and wrapping, and suggests the additiional cost and time of a glazing or finishing step. The dough system of Turitz involves using a relatively high level of water, which is, due to its high specific heat, difficult to remove during further processing. Such removal of water is necessary to obtain the desired crisp texture. The method and product of Turitz also require the use of egg, a costly ingredient.

The above-mentioned U.S. Pat. No. 4,161,545 to Green described a honey coated roasted nut, produced by first coating nuts in a honey and water mixture; then "enrobing" the coated nuts in a sugar-starch mixture; and finally roasting and cooling quickly. After cooling, the nuts may be dusted with salt or a salt/sugar mixture. It appears that a principal goal was to improve color and consistency of adhesion, as well as flavor, by the use of honey (which is not necessary in the instant invention). The primary purpose of the sugar-starch mixture in Green appears to to be to prevent the honey coated nuts from adhering to each other, rather than for flavor or to control coating density, as by "puffing". There is no suggestion to repeat the liquid and solid coatings, and the only flavoring suggested is honey-based, using a far greater amount of honey than would the instant invention, even for a honey-flavored version.

Thus the prior art leaves unsolved the problem of disclosing or suggesting a process for making a food product which is appealing in taste and appearance, while being economical, quick and convenient to manufacture, able to be made with a variety of distinctive yet appetizing flavors; capable of being produced with commonly available equipment and minimal labor costs.

The known prior art does not disclose or suggest a process which accomplishes these goals without one or more negative features. In particular, it is desirable to avoid the use of a dough, thus eliminating the time and expense of a kneading step, and thereby also avoid the introduction of excess water which only needs to be removed later. In addition, it is desirable to avoid baking, which has the cost and inefficiency inherent in using air as a heat exchange mechanism. The use of expensive ingredients, like eggs, is preferably eliminated or reduced.

SUMMARY OF THE INVENTION

In order to overcome these problems within the constraints noted, the instant invention uses a method of treating nuts which involves the using a liquids and a solids mixture, applied in turn, and repeatedly, to nuts. First a liquid mixture, of water, sugar, and tapioca, is coated onto the nuts, such as by spreading on nuts tumbling on a conventional coating pan.

Next added is a solids mixture, of flour, modified corn starch, sugar and salt, with small amounts of flavoring (i.e., selected flavor and color elements), which flavoring is usually most conveniently applied if mixed with a carrier of a small amount of vegetable oil, which also acts to improve texture by making the final product crisper.

The solids are added to coat onto the tumbling wet nuts. The solids portion is then permitted to dry before the next additions of liquids. The steps of coating with liquid, coating with solid, and drying are then repeated until the desired thickness of coating is obtained, usually requiring some four to six repetitions. The liquid and solid coated nuts are then cooked, preferably by deep-fat frying after removal from the coating pan.

This procedure has several advantages over prior methods and resultant products. The modified corn starch in the solids mixture is designed to puff, thereby controlling density without the use of additional leavening. A waxy, pre-gelatinized maize works well. By so pre-cooking with water, and allowing the starch to swell and burst, a cross-linked spongy structure is formed.

Deep fat frying is a far more efficient heat exchange mechanism than moving air. No additional flavor sauce or glazing steps are required, as the mixtures, particularly the solids mixture, will contain whatever flavorings are desired, such as chili, salt and pepper, coconut, etc. Corn, raisins, berries or other centers can be used instead of nuts, although the process is principally directed to flavored nuts, such as peanuts.

DESCRIPTION OF THE PREFERRED EMBODIMENT

One thousand grams of unblanched, partially roasted spanish peanuts are placed in a coating pan, and the pan is switched on. A water-based liquid containing liquid sugar and modified tapioca is spread onto the tumbling nuts. The formula for the liquid portion is as follows:

TABLE 1

| Water | 52% | 709 grams |
|---|---|---|
| Liquid Sugar | 18% | 236 grams |
| Modified Tapioca | 30% | 405 grams |
| total | | 1350 grams |

The proportion of ingredients can of course be varied. Sugar should be in the range of 10–25%; preferably 16.5 to 19%. Tapioca should be in the range of 20–45%; preferably 25–35%. Water would be varied to make up the remaining percentage.

One modified tapioca that has been found to work well in the process is available from the National Starch Company under the designation of No. 4484.

Next, a mixture of solids is placed on the tumbling, wet nuts and, after coating, is permitted to dry. The formula for the solids portion is as follows:

TABLE 2

| (pepper flavor) | | |
|---|---|---|
| AP Flour | 58% | 784 grams |
| Starch | 7% | 92 grams |
| Sugar | 27% | 374 grams |
| Salt | 5.22% | 72 grams |
| Capsicum | 0.1% | 1.31 grams |
| Oleo pap | 0.68% | 9.3 grams |
| Vegetable oil | 2% | 28 grams |
| total | | 1361.61 grams |

A modified corn starch (i.e. waxy, pre-gelatinized maize) sold under the name Bakasnak and all purpose ("AP") or "straight" flour have been found to work well in the solids mixture of the invention.

Again, the proportion of ingredients can be varied. The starch can be in the range of 6–10%; preferably 6.5–8%. Sugar can be in the range of 10–50%; preferably 20–40%. Salt can be in the range of zero–7.5%; preferably 4–6%.

The flavoring (the term being used to include both flavor and color ingredients) can vary widely, and should generally be in the range of 1–4%; preferably about 2–4%. The flavoring in this example includes both flavor and color ingredients: the active principle in pepper (capsicum) and the oil-soluble fraction of paprika, oleo resin paprika ("oleo pap").

Vegetable oil is useful in small quantities to make a crisper texture and as a carrier for the flavoring. The oil can be in the range of zero–5%; preferably zero–3%.

The addition of liquids, then of solids, then drying, is repeated until the desired thickness is obtained, usually requiring some two to ten repetitions.

The coated nuts are then removed and cooked. Cooking is preferably done by deep fat frying, at a temperature between about 270 and 420 degrees (F.) and preferably between 290 and 310 degrees (F.). In this example, cooking is accomplished by deep fat frying at 300 degrees (F.) for five minutes in partially hydrogenated vegetable oil, with a melt range of 80–87 degrees (F.), such as "Crisco" or Spry". The fried, coated nuts can then be cooled and packaged in any conventional manner.

It will be appreciated that numerous variations and modifications can be made within the scope of the invention, and the above-description of one preferred embodiment is not intended to limit the scope of the broader scope and claims of the invention. Other flavorings can be placed in the coating mixtures, such as curry, chocolate, soy sauce, mustard, chili, cheese, mocha, liquor, vanilla, nacho, bar-b-que, honey, mint and combinations. Other coating methods could be used, such as the more precise but far more expensive "fluid bed" method employed in the pharmaceutical industry. Precise formulations and choice of particular ingredients can be varied. The unblanched, partially roasted, spanish peanuts could be uncooked, fully roasted, replaced by other nuts, or even non-nut centers, such as raisins.

We claim:

1. A process for making a flavored-food product, said process comprising the steps of:

first, coating an edible core portion with a liquid portion, said liquid portion consisting essentially of a mixture of water, sugar and tapioca;

second, coating the liquid-coated cores with a solids portion, said solids portion consisting essentially of a mixture of starch, flour, sugar, salt and flavoring;

third, drying the solids portion onto the liquid-coated cores;

fourth, repeating steps "one" through "three" (liquids coating, solids coating and drying) at least twice, in amounts and proportions of said liquids portion sufficient to hold said solids portion in place around said edible core portion, and for said solids portion, in amounts and proportions sufficient to control coating and thus give the desired flavor, puffing, texture, and consistency; and fifth, cooking the liquid and solid coated cores at temperatures sufficient to provide further control.

2. The process of claim 1, where the starch of said solids portion is one which has been modified to enhance puffing, and thereby control and decrease density, and cooking is accomplished by frying.

3. The process of claim 1, where the starch is waxy, or pre-gelatinized, or both.

4. The process of claim 2, where said solids portion also contains a relatively small quantity of oil, and where the approximate proportion of ingredients is as follows:

for the liquid mixture: sugar, 10–50%; tapioca, 20–45%; and the remainder water;

and for the solids mixture: modified starch, 6–10%; sugar, 10–50%; salt, zero–7.5%; oil, zero–5%; flavoring, 1–4%; and the remainder flour;

and where steps "one" through "three" (liquids coating, solids coating, and drying) are repeated about two to nine times;

and where cooking is done by frying in oil at a temperature of approximately 270–420 degrees (F.).

5. The process of claim 3, where the liquid portion contains liquid sugar and modified tapioca, and the solids portion contains all purpose flour and vegetable oil and where the approximate proportion of ingredients is as follows:

for the liquid mixture: liquid sugar, 16.5–19%; modified tapioca, 25–35%; and the remainder water;

and for the solids mixture: waxy, pre-gelatinized corn starch, 6.5–8%; sugar, 20–40%; salt, 4–6%; vegetable oil, zero–3%; flavoring, 2–3%; and the remainder flour, and where steps "one" to "three" are repeated about four to six times, and where cooking is done by frying in oil at a temperature of approximately 290–310 degrees (F.).

* * * * *